May 26, 1970  F. W. SHACKLOCK ET AL  3,513,566
TUMBLER DRIERS
Filed March 6, 1968
5 Sheets-Sheet 1
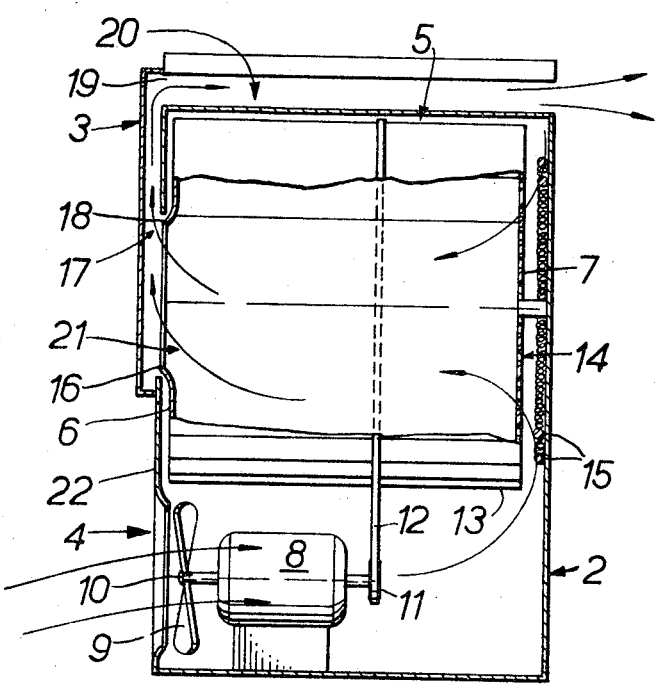
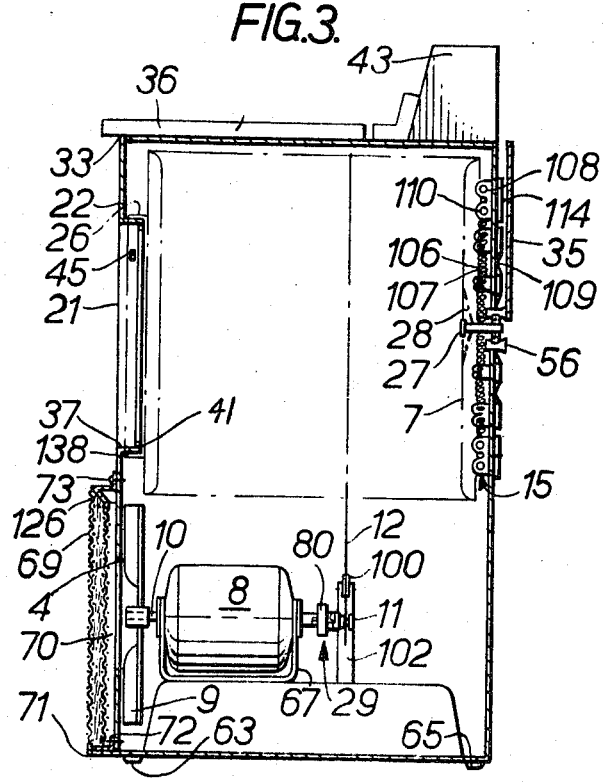
INVENTORS
Frank W. Shacklock
et al
BY
Holman, Glascock, Downing & Seebohm
ATTORNEYS

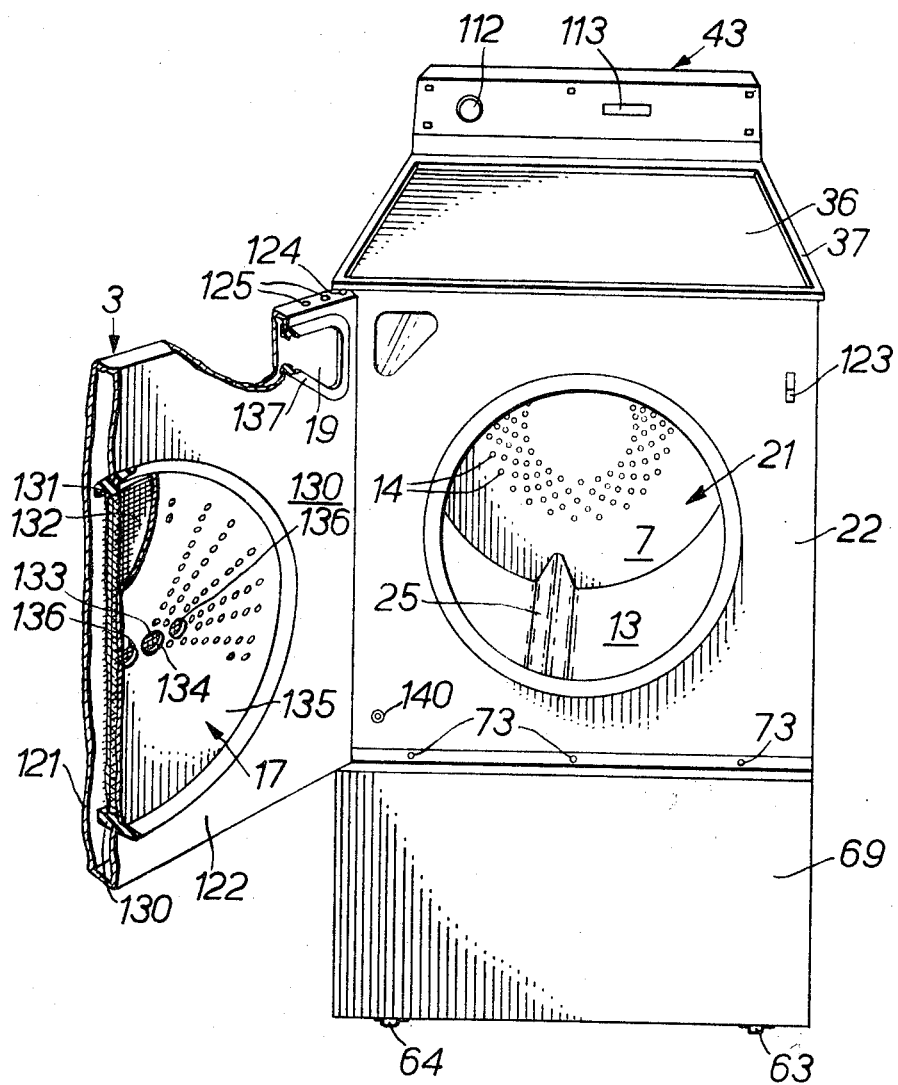

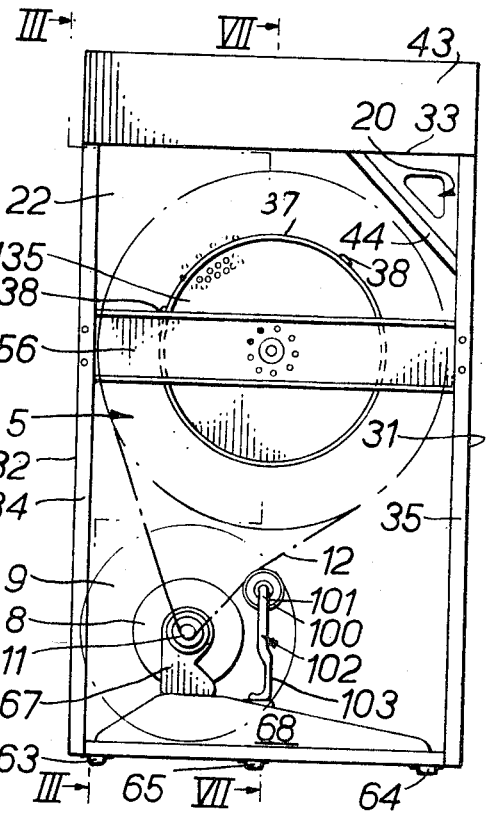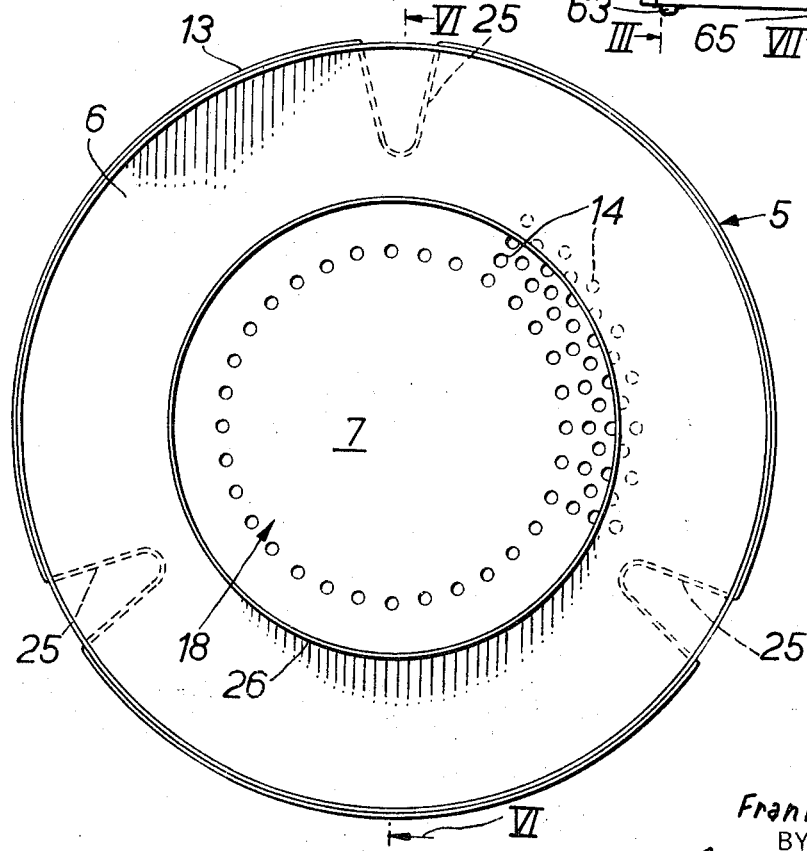

May 26, 1970  F. W. SHACKLOCK ET AL  3,513,566
TUMBLER DRIERS
Filed March 6, 1968  5 Sheets-Sheet 4
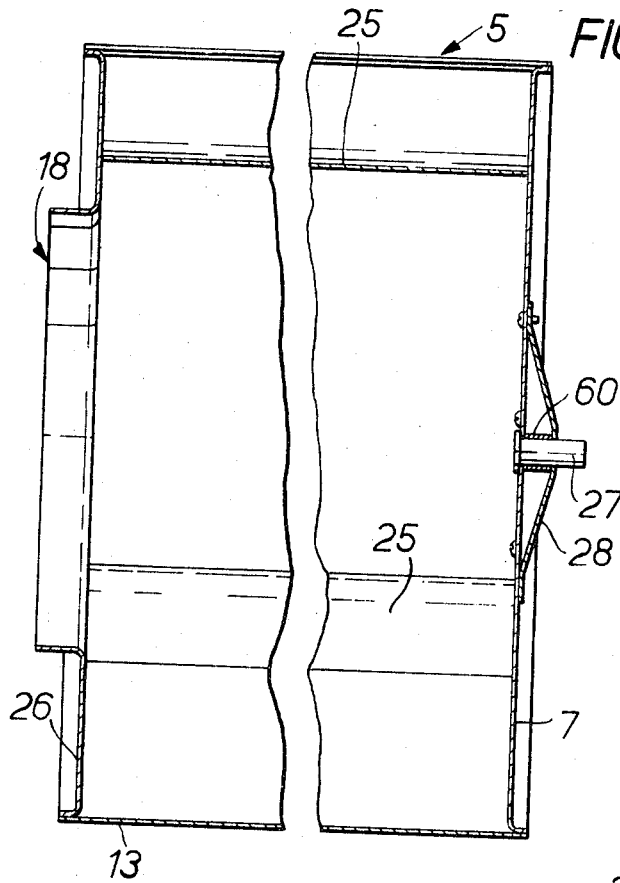
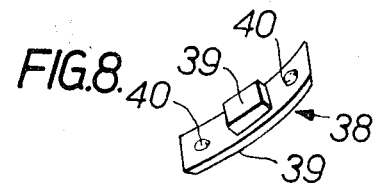
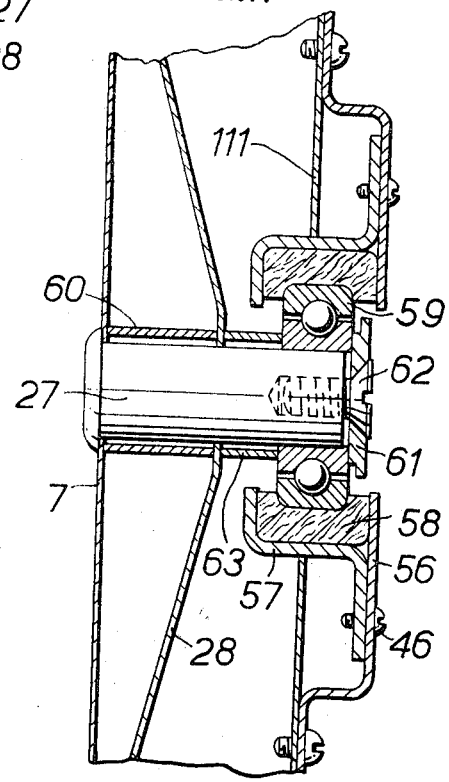
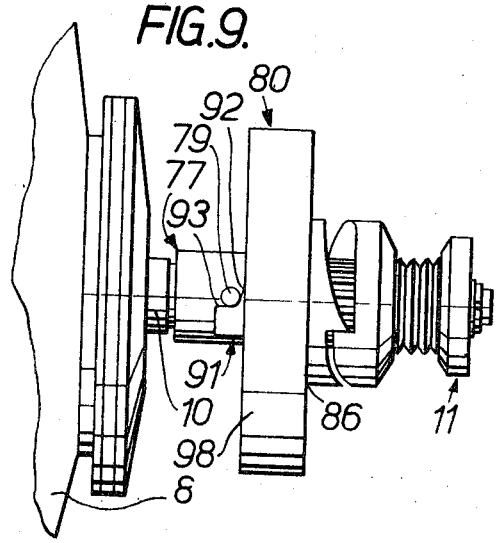
INVENTORS
Frank W. Shacklock
et al
BY
Helman, Glascock, Downing & Seebold
ATTORNEYS United States Patent Office 3,513,566
Patented May 26, 1970

3,513,566
TUMBLER DRIERS
Frank Whitney Shacklock, 16 Watson Place, Papatoetoe;
Donald Robert Baird, 73 Ti Rakau Drive, Pakuranga;
and Keith Desmond Ferguson, 19 Kipling Ave., Epsom,
all of Auckland, New Zealand
Filed Mar. 6, 1968, Ser. No. 710,989
Claims priority, application New Zealand, Mar. 8, 1967,
148,063; June 2, 1967, 149,000; Dec. 12, 1967, 151,015
Int. Cl. F26b 17/20
U.S. Cl. 34—133
20 Claims

ABSTRACT OF THE DISCLOSURE

A tumbler drier has a horizontally positioned drum rotatably mounted inside a substantially air tight cabinet and a reversible electric motor drives a non-directional fan which pressurizes the cabinet with air at room temperature and also drives the drum via a unidirectional clutch. Most of the air within the cabinet passes into the drum and is heated by a heater before entry therein, and the remainder passes directly to exhaust via a small air gap between the drum and the cabinet, and the pressure gradient across this gap stopping any air from the drum returning into the cabinet. In one mode of operation the drum is driven to tumble the articles therein while hot air is forced past them to abstract moisture and in the other the drum is stationary while the articles are dried.

BACKGROUND OF THE INVENTION

This invention relates to tumbler driers.

Tumbler driers are well known and usually comprise a cabinet housing a tumbler drum supported for rotation about a horizontal axis. Wet articles placed in the drum are raised by means of paddles within the drum as the drum is slowly rotated and at the same time hot air is forced through the drum to carry away moisture from the articles.

There are in existence a number of basic air flow systems used on driers of this type. One system has the fan placed immediately at the rear of the drum for drawing air through the cabinet and pushing it through the drum of wet articles from whence it is ducted to the atmosphere. This type has the disadvantage of requiring a large area air seal with a moving surface to prevent air exhausted from the drum from re-circulating into the cabinet where condensation of the moisture carried in the air can occur and the accumulation of lint poses a fire hazard. Another system has a fan which aspirates air through the drum of wet articles thus reducing the importance of drum sealing, but involving considerable internal ducting within the cabinet in other areas. Generally, either the fan or the ducting takes up space which would otherwise enable the drum to be larger in relation to the cabinet size. The necessity for the provision of air seals and/or ducting increases the cost of the drier, which is of course disadvantageous. Furthermore, the air seals which have generally been used have been of felt which is subject to wear, and therefore those driers with this type of seal require periodic maintenance. Finally, driers with a large amount of internal ducting are generally noisy because of the vibration of the numerous metal panels forming the cabinet and ducting. Moreover, in some tumbler driers no provision is made for drying articles which should not be tumbled, e.g. some woolen fabrics.

It is therefore an object of the present invention to provide a tumbler drier which at least partially overcomes the abovementioned disadvantages and/or which provides the public with a useful choice.

SUMMARY OF THE INVENTION

Accordingly the present drier comprises a cabinet, a rotatable drying drum within said cabinet into which articles to be dried may be placed, driving means to rotate the drying drum, a heater within said cabinet, a source of air under pressure, an air inlet to said drying chamber from said cabinet, and an air exit aperture from said drying chamber characterized in that said cabinet is substantially air tight, and pressurized above atmospheric pressure by said source of air under pressure in use, barrier mean between said drying drum and said cabinet so there is a negligible flow of air between said exit aperture and the interior of said cabinet and the relative positions of said air inlet and said heater to said drying chamber and said cabinet being such that most of the pressurized air within said cabinet is moved by a pressure differential past said heater where it is heated, through said air inlet, through sad drying drum which may be rotated and wherein moisture is removed from wet articles therein, and thence exhausts through said air exit aperture.

In a preferred form the tumbler drier comprises a substantially air tight cabinet, a door in the front thereof for loading and unloading purposes, a cool air inlet aperture in said cabinet, a drum comprising a substantially tubular wall with an end plate attached to each end, said drum having its axis substantially horizontal and being mounted within said cabinet for rotation about its axis, an aperture in the front end plate of said drum accessible via said door to enable said drum to be loaded or unloaded, one or more hot air inlet apertures and one or more exit apertures in said drum, an electric drive motor mounted on said drier, first drive means enabling said drum to be slowly rotated about its axis by said motor in use in order to tumble the articles to be dried within said drum, a fan rotatably mounted in association with said drier, second drive means enabling said fan to be rotated by said motor in use to cause outside air to flow through said cool air inlet aperture into said cabinet to pressurized the same above atmospheric pressure, a heater to heat the air within said cabinet before it enters said one or more hot air inlet apertures, barrier means between said drum and said cabinet so that there is a substantially negligible flow of air between said one or more exit apertures in said drum and the interior of said cabinet and exhaust means in said drier communicating with said one or more exit apertures in said drum to enable the air from said drum to escape outside said cabinet, the construction and arrangement being such that in use wet articles are slowly tumbled as the drum rotates and are dried by the heated air forced through said drum.

One preferred form of the present invention will now be described with reference to the accompanying drawings in which

BRIEF DESCRIPTION OF THE DRAWINGS

FIG. 1 is a side view partly in elevation and partly in cross section indicating the air flow through the tumbler drier, FIG. 2 is a perspective view from the front of the tumbler drier showing the door open and partly in cross section, FIG. 3 is a section on the line III—III of FIG. 4 with the door removed and the drum dotted only for clarity, FIG. 4 is a view from the rear with the rear panel of the cabinet removed, with the drum being shown in dotted outline and the heater and its mounting plate removed, FIG. 5 is a front view of the tumbler drum, FIG. 6 is a central cross section of the tumbler drum on the line VI—VI of FIG. 5, FIG. 7 is an enlarged cross section on the line VII—VII of FIG. 4 of the rear bearing of the drum and its mounting, FIG. 8 is a perspective view of a bearing pad for the tumbler drum, FIG. 9 is an enlarged side view of part of the motor and the unidirectional clutch and drum driving pulley.

DETAILED DESCRIPTION OF THE INVENTION

Figure 10:
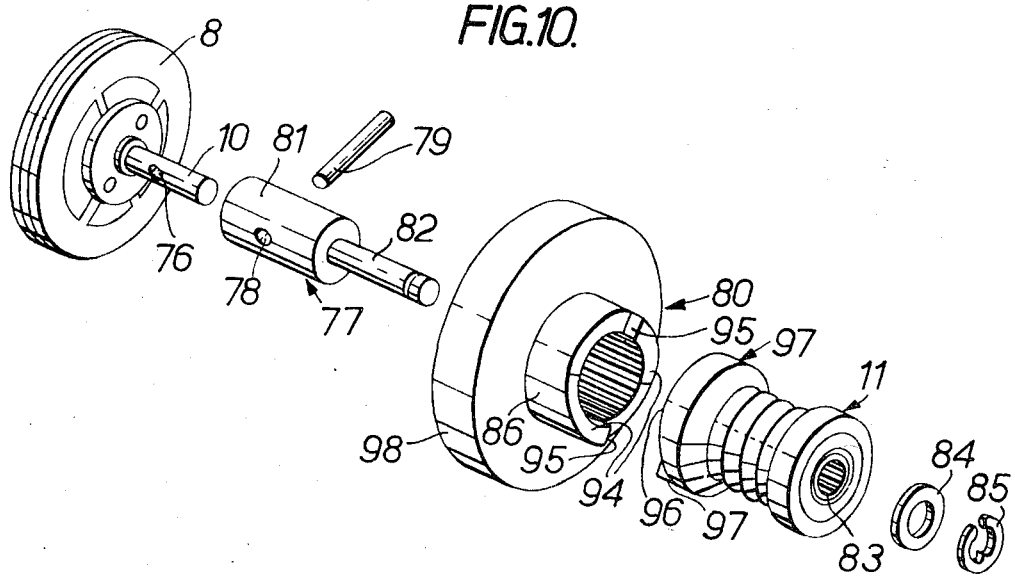
FIG. 10 is an exploded perspective view of the clutch.

Referring now to FIG. 1, the tumbler drier comprises a substantially air-tight cabinet 2 having a door 3 in the front for loading and unloading purposes, a cold air inlet 4 below the door and a substantially cylindrical drum 5 of about 52 cm. diameter and length with front and rear end plates 6 and 7 at the front and rear ends. The drum is mounted within the cabinet for rotation about its axis which is substantially horizontal. Housed within the cabinet is a 95 watt electric induction motor 8 having a fan 9 connected to second drive means comprising a drive shaft 10 on one side of the motor. A drum driving pulley 11 lies on the other side of the motor and is drivable by the drive shaft 10 via a unidirectional clutch 29 (see FIG. 3). A belt 12 passes around the pulley 11 and cylindrical wall 13 of the drum 5 to enable the drum to be rotated in use at about 55 r.p.m. The drive shaft 10, pulley 11 and belt 12 constitute first drive means. The drum includes a plurality of hot air inlet apertures 14 in the rear end plate 7 and situated immediately opposite and close to these apertures is a radiant electric heater 15 with an output of 1 kw. or 2 kw. selectable by the operator. At the front of the drum there is a small gap 16 between the cabinet and the front end plate 6 which constitutes an air seal preventing air leaving the drum 5 from returning to the cabinet 2 because the air pressure within the cabinet at this point is greater than the pressure of air leaving the drum. The door 3 is hollow and includes a large aperture 17 aligned with a large loading and unloading aperture 18 in the front end plate 6 and a similar aperture 21 in front wall 22 of the cabinet and includes a further aperture 19 which mates with a duct 20 extending through the cabinet to the rear thereof. In use, therefore the fan 9 draws cold air through the cold air inlet aperture 4 at the rate of just under 6 cubic meters per minute to pressurize the cabinet 2. The easiest path for the air to take is then through the hot air inlet apertures 14 at the rear of the drum 5 and a good proportion of the air passing through these apertures is heated by the heater 15, so that its moisture carrying capacity is increased. The air then passes through the drum 5 to the front where it mingles with the small amount of air which leaks through the air seal 16, and passes through the door 3, the duct aperture 19 in the door, the duct 20 and exhausts at the rear of the cabinet. This is a convenient exhaust point because frequently a further duct will be installed here to carry the exhaust air outside the building in which the drier is installed and of course the exhaust point should be as far away as possible from the cold air inlet aperture.

The cylindrical wall 13 of the tumbler drum (FIG. 5) comprises one sheet of stainless steel having three involutions 25 which act as paddles to raise or tumble the articles within the drum 5 so that they drop down through the flow of air. The front end plate 6 is also stainless steel and is flanged at the periphery and spot welded to the front of the cylindrical wall 13. The front end plate includes a protruding skirt 26 defining central loading and unloading aperture 18. The rear end plate 7 is also stainless steel and is flanged at its periphery and spot welded to the rear of the cylindrical wall 13 and includes 156 holes 14 which are 9.5 millimeters in diameter evenly spaced in four rows concentrically around the axis of the drum. A short spindle 27 (FIG. 6) protrudes outwardly through a hole in the rear end plate 7 and is additionally supported by means of a shallow conical member 28 screwed to the rear end plate 7 as will be described later.

The cabinet 2 per-se is of wrap-around construction (FIGS. 2–4) and its two side walls 31, 32 and the front wall 22 comprises a single sheet of steel which is folded into a substantially U-shaped configuration with two inwardly facing flanges 34, 35 (FIG. 4) at the rear for receiving screws to fasten on a rear panel (not shown). The rear panel has a very small flange turned around its perimeter both to strengthen it and to give the cabinet a good appearance from the side. The walls of the cabinet are also inwardly flanged at both the top and bottom and to the top flange is spot welded a false top 33, comprising a sheet of metal which projects beyond the front wall 22. Under this projection lie the heads of screws used to secure a proper top 36 and its decorative side trim 37. At the rear of the false top 33 is spot welded a control console 43 which is not shown in detail in the drawings. This console includes a flange to which the rear of the top 36 is screwed by means of screws accessible from the rear of the cabinet. The duct 20 is simply provided by means of a diagonal panel 44 suitably flanged and spot welded along its length to the false top 33 and at either end to the front wall 22 of the cabinet and the flange 35. To preserve the finish of the cabinet, no welds are made between the panel 44 and the side wall 31 of the cabinet but the joint is sealed with a flexible sealing compound.

In the front wall 22 of the cabinet there is the loading and unloading aperture 21 around which is spot welded a circular flange 37 (FIG. 3) of L-shaped cross section, and inner edge 41 thereof is rolled to prevent tearing articles during loading or unloading of the drum. Situated on either side of the vertical center line and at the top of the flange 37 and in the position shown in FIG. 4 are two square holes into each of which fits a block 45 of a drum bearing pad 38 of Teflon impregnated sintered bronze shown in detail in FIG. 8. Outer surface 39 of these pads bear against the inward facing surface of the skirt 26 on the front end plate 6 thus supporting the front of the drum. The block 45 on each pad fits into the square holes in the flange 37 and dimples 40 on either side of the block also bear on the flange 37 and ensure that the pads can tilt into the correct alignment. Alternatively, the conventional wheels could be used to support the outer surface of the skirt 26 from below.

At the rear of the cabinet there is a cross-bar 56 (FIGS. 3, 4 and 7) to which is secured a bearing cap 57 by means of six screws 46 (FIG. 4). The bearing cap holds a rubber block 58 in which is mounted a ball bearing 59 (FIG. 7). The spindle 27 extending through the rear end plate 7 of the drum has a sleeve 60 thereabout between the rear end plate 7 and the conical plate 28 and another sleeve 63 between the conical plate and the hub of the ball bearing and the spindle is clamped to the bearing 59 by means of a washer 61 and screw 62 which draws the whole assembly together. The crossbar 56 is bolted to the flanges 34 and 35 at the rear of the cabinet (FIG. 4). The mounting arrangement for the drum is such that the drum 5 can be of a very large size with respect to the floor area occupied by the cabinet.

Below the drum the electric motor 8, which is wired so that its drive shaft 10 may be reversed in rotation, is mounted on a bracket 67 on floor 68 of the cabinet which is specially shaped to provide a pedestal of suitable height for the motor and also to strengthen the floor and eliminate resonance by imparting a high degree of stiffness thereto. The floor 68 is spot welded around the edges to flanges turned inwardly on the front and side walls 22, 31 and 32 of the cabinet. The floor includes two front feet 63 and 64 and one central rear foot 65 so that the cabinet is self levelling. The motor 8 is mounted with its drive shaft 10 parallel to the axis of the drum 5 and on the front end of the drive shaft is secured the non-directional centrifugal fan 9. The fan 9 is constructed of A.B.S. plastic and has a central molded metatl boss which is radially tapped in two places to receive two grub screws each of which bears on a flat on the front end of the motor shaft 10 to secure the fan thereon. The fan, which is 30 cm. in diameter, is capable of moving air at the rate of just under 6 cubic meters per minute and is driven at 1425 r.p.m. The cold air inlet aperture 4 is a 15 cm. diameter hole in the front wall 22 concentric with the center of the fan and is covered by means of a protecting panel 69 (FIG. 3) which has a slot 70 at either side and a perforated base flange 71. At the bottom, the panel includes keyhole slots to enable it to be hooked over the heads of screws 72 protruding from the front wall 22 of the cabinet and at the top it is secured directly to the front wall by means of screws 73 which are concealed when the door 3 is closed. Naturally, if a source of air under pressure was available, which might be the case in some industrial applications, the fan could be eliminated and the air piped directly into the cabinet. Furthermore, the motor and fan could both be associated with the drier outside of the air tight cabinet. The fan could push air in through a cool air inlet aperture and the motor could drive the drum via means attached to an extended spindle 27 which could project through the rear wall of the cabinet. In that case, the drum need not necessarily have a cylindrical wall as this is only necessary when the drive is to be by a belt around the drum periphery.

Figure 11:
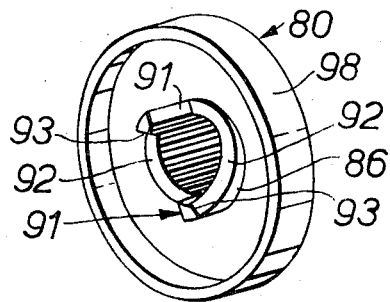
FIG. 11 is a perspective view of the other side of the clutch wheel member shown in FIG. 10.
Figure 12:
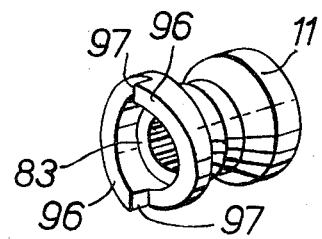
FIG. 12 is a perspective view of the other side of the drum driving pulley shown in FIG. 10.

The other end of the motor drive shaft 10 has a small hole 76 diametrically therethrough (FIG. 10) and a shaft extension piece 77 of stepped outer diameter also includes a diametrical hole 78 of the same diameter as the hole 76 in the motor shaft and is secured to the motor shaft by means of a pin 79 which is a push fit in these holes (see FIG. 9). A clutch wheel 80 is free to slide and, in certain circumstances, to rotate on a large diametered portion 81 of the extension piece 77. On a small diametered portion 82, the nylon multi-grooved pulley 11 having an internal bronze bushing 83 is secured by means of a washer 84 and circlip 85 against sideways sliding movement. The action of the unidirectional clutch is such that when the motor drive shaft 10 rotates in a counter-clockwise direction, the pulley 11 is driven and thus serves to rotate the drum 5 via the belt 12 which passes around both the drum and the pulley as illustrated in FIG. 9. When the drive shaft 10 rotates in a clockwise direction, (looking at the pulley end of the shaft) the clutch wheel 80 slides to a position such that the pulley 11 is no longer driven and the drum 5 therefore does not rotate. The detailed operation of the clutch is as follows:

A hub 86 of the clutch wheel 80 facing the pin 79 is profiled to include two faces 91 parallel to the axis of the wheel 80 (FIG. 11) and each offset from a common diameter by the radius of the pin 79. There are two opposite rising portions 92 which blend in with a radius equal to the radius of the pin 79 with two opposite parallel faces 93 normal to the plane of the clutch wheel 80 and each offset from a common diameter through the wheel by the radius of the pin 79. When the pulley is driven, the pin rests with its ends against each of the blending radii at the junction of the rising portions 92 and the faces 93 (see FIG. 9). In that position, the clutch wheel 80 is forced outwardly along the extension piece 77 towards the pulley 11. This occurs when the motor shaft rotates in a counter-clockwise direction as viewed from the end showing in FIG. 10. When the drive shaft 10 rotates in a clockwise direction, the ends of the pin 79 contact the parallel faces 91 of the hub and the clutch wheel is free to slide towards the pin as will now be described. On the other side of the clutch wheel 80 the hub 86 has another two opposite rising portions 94 (FIG. 10) and two faces 95 lying on a diametrical plane along the axis of the clutch wheel 80. The pulley wheel 11 includes a similar arrangement of rising portions 96 and faces 97. When the clutch wheel 80 is forced towards the pulley 11 by the pin 79 engaging with the rising portions 92, the faces 95 and 97 engage so that the pulley is driven. When the shaft 10 rotates in the opposite direction, the rising portions 94 and 96 interengage and the clutch wheel 80 is forced towards the pin 79 which is engaged with the faces 91 and the clutch wheel completely disengages from the pulley 11. The clutch wheel and pulley are both made of nylon and the former includes a large rim 98 to give the wheel sufficient inertia to ensure that it always slides axially initially on a change of shaft direction rather than rotates.

FIGS. 3 and 4 also show the belt tensioning device comprising an idler wheel 100 mounted on a pin 101 supported on either side by a spring arm 102. The foot of the spring arm has two slotted holes which enable it to be secured in an appropriate position by means of screws engaging with the floor 68 of the cabinet. A portion 103 of the spring arm flexes sufficiently to enable the belt tension to be maintained. This is quite important because the pulley 11 is of very small diameter and hence has only a small surface area in contact with the belt. However, this small pulley diameter is necessary because of the large diameter of the drum, the fixed speed of the motor (1425 r.p.m.) and the optimum speed of the drum (55 r.p.m.).

Some details of the heater 15 are shown in FIG. 3. Two spiral resistance elements 106, 107 each of 1 kw. are threaded through apertures 108, 109 in twelve porcelain spacers 110 spaced in radial slots around a mounting plate 111 which is an aluminium disc pressed from the same die as is the end plate 7. The elements terminate in terminal blocks (not shown) on the mounting plate. The mounting plate 111 is itself screwed to the cross-bar 56 (FIG. 7). The elements 106, 107 are so wired that both, one or neither of which may be operated when the fan is driven. The wiring is such that a cycle timing device 112 (FIG. 2) in the control console deactivates both heaters for the last 10 minute period of each cycle. Otherwise, the heats are selected by push-buttons 113. The porcelain spacers 110 themselves are slightly wider on the rear side than the length of the slot in which they are placed so that they only pass part way therethrough. They are held in position by means of a wire 114 which is laced under tabs (not shown) pressed from the mounting plate 111. At the top of the mounting plate at the rear behind a hole in the plate, a thermostat (not shown) is positioned which deactivates the electrical supply to the elements in the event of overheating. Alternatively, a gas or other recognized form of heater could be used.

Details of the door 3, which is preferably provided to cover the drum loading aperture 18, and its mounting are shown in FIGS. 2 and 3. The hollow door comprises outer and inner panels 121 and 122 secured together by screws in their edge flanges as well as a recessed handle at the top outer right hand corner and a protruding catch pin behind the handle on the inside surface (not shown). The catch pin engages with a catch plate 123 (FIG. 2) recessed in the front wall 22 of the cabinet. Plates with protruding hinge pins 124 are fastened by screws 125 within the door at the top and bottom left hand corners. The pins 125 engages with a hole in the false top 33 and a nylon bracket 126 (FIG. 3) concealed by the panel 69. The height of the bracket 126 is adjustable so that the door can be accurately hung. The circular aperture 17 in the door is bordered by a rubber seal 130 having a groove 131 to carry a lint collecting gauze 132. A nylon button 133 extends through a central hole in the gauze in which it is positioned and is grooved to accommodate the top edge of an aperture 134 in a circular perforated plate 135 which is hung on the button and protects the gauze. Two finger holes 136 enable the plate 135 to be easily removed when the gauze is to be cleaned. A lip on the seal 130 seals against the front wall 22 of the cabinet when the door is shut. A rubber seal 137 is also provided around the small aperture 19. A cut-off switch 140 (FIG. 2) mounted in the front panel 22 of the cabinet serves to deactivate the heater and motor electrical supply as soon as the door 13 is opened.

Two of the switches 113 control the direction of rotation of the motor shaft 10 so that the drum 5 can be rotated during drying or alternatively two paddles 25 can be horizontally positioned to support a rack on which may be placed articles to be dried with the drum in a stationary condition.

As can be seen from FIG. 3, there is only a small air gap 16 between the skirt 26 of the front end plate 6 and the flange 37 attached to the cabinet. Through this gap a small amount of substantially unheated air passes which ensures that moisture laden air from the drum 5 cannot return into the cabinet 2. Alternatively, a conventional type of seal could be used. Most of the air drawn into the cabinet, however, finds its way through the hot air inlet holes 14 in the rear end plate as these collectively add up to quite a large passage and the air gap 16 is a barrier allowing only a negligible amount of air to flow between the cabinet 2 and the exit aperture 18 in the drum 5. The distance between the rear end plate 7 and the heater mounting plate is about 3.75 cm. and the heaters 106, 107 are opposite the rows of holes 14 so that air entering the drum 5 is heated just before entrance to increase its moisture carrying capacity. Over heating of other components within the cabinet is thus avoided.

The main advantages of the drier may be summarised as follows:

(1) Absence of noise because of the absence of a large amount of ducting and the air pressure maintained within the cabinet.

(2) A large drum size in relation to floor space occupied by the cabinet because of the simple drive system used and the absence of ducting.

(3) A simple mechanical arrangement which enables any article to be dried with either hot air of one or two selectable temperatures for long periods and/or cold air for short periods while they are either stationary or being tumbled.

(4) A drum to cabinet seal which is maintenance free and obviates the risk of fire.

(5) The overall simplicity of the whole arrangement results in a considerable reduction in cost.

What we claim is:

1. A drier comprising a cabinet, a rotatable drying drum within said cabinet into which articles to be dried may be placed, driving means for rotating said drying drum, a heater within said cabinet, source of air under pressure, an air inlet to said drying chamber from said cabinet and an air exit aperture from said drying chamber the improvement comprising said cabinet being substantially air tight and pressurized above atmospheric pressure by said source of air under pressure in use, barrier means between said drying drum and said cabinet so there is a negligible flow of air between said exit aperture and the interior of said cabinet the relative positions of said air inlet and said heater to said drying drum and said cabinet being such that most of the pressurized air within said cabinet is moved by pressure differential past said heater where it is heated, through said air inlet, said drying drum which may be rotated and wherein moisture is removed from wet articles therein, and thence exhausts through said air exit aperture.

2. A tumbler drier comprising a substantially air tight cabinet, a door in the front thereof for loading and unloading purposes, said cabinet having a cool air inlet aperture, a drum comprising a substantially tubular wall with an end plate attached to each end, said drum having its axis substantially horizontal and being mounted within said cabinet for rotation about its axis, said drum having an aperture in the front end plate accessible via said door to enable said drum to be loaded or unloaded, said drum being provided with one or more hot air inlet apertures and one or more exit apertures, an electric drive motor mounted on said drier, first drive means enabling said drum to be slowly rotated about its axis by said motor in use in order to tumble the articles to be dried within said drum, a fan rotatably mounted in association with said drier, second drive means enabling said fan to be rotated by said motor in use to cause outside air to flow through said cool air inlet aperture into said cabinet to pressurize the same above atmospheric pressure, a heater to heat the air within said cabinet before the air enters said one or more hot air inlet apertures, barrier means between said drum and said cabinet so there is a substantially negligible flow of air between said one or more exit apertures in said drum and the interior of said cabinet, and exhaust means in said drier communicating with said one or more exit apertures in said drum to enable the air from said drum to escape outside said cabinet, the construction and arrangement being such that in use wet articles are slowly tumbled as the drum rotates and are dried by the heated air forced through said drum.

3. The tumbler drier as claimed in claim 1 wherein said barrier means is defined by means providing a small air gap between said drum and said cabinet.

4. The tumbler drier as claimed in claim 2 wherein said drum is drivable via a unidirectional clutch from a reversible motor which also drives a non-directional fan to pressurize said cabinet so that in one mode of operation said drum may be slowly rotated about its axis in order to tumble articles to be dried within it and in another said fan still rotates but said drum is stationary.

5. The tumbler drier as claimed in claim 4 wherein said tumbler wall of said drum is cylindrical and first drive means to enable said drum to be rotated includes a pulley associated with the drive shaft of said motor, said unidirectional clutch being attached to said drive shaft and capable of driving said pulley and a belt passing around said pulley over said cylindrical wall of said drum.

6. The tumbler drier as claimed in claim 5 wherein said unidirectional clutch comprises a wheel member having motor drive shaft engagement means on one side thereof and pulley engagement means on the other, the construction and arrangement being such that said wheel member is slidable parallel to said motor drive shaft between two positions in one of which said wheel member is locked to both said drive shaft and said pulley via the respective said engagement means and in another of which said pulley engagement means is disengaged from said pulley, with the position of said wheel member being determined by the direction of rotation of said motor drive shaft.

7. The tumbler drier as claimed in claim 6 wherein said pulley also includes wheel engagement means facing said wheel and coacting with said pulley engagement means such that the inertia of said pulley, belt and drum causes said wheel member to slide away from said pulley when said motor drive shaft is rotated in one direction to effect disengagement of said pulley engagement means and said wheel engagement means so that said pulley is no longer driven.

8. The tumbler drier as claimed in claim 7 wherein said pulley engagement means and said wheel engagement means comprise a series of ramps and steps positioned around annuli of said wheel member and said pulley.

9. The tumbler drier as claimed in claim 7 wherein said motor drive shaft includes a protruding pin which coacts with said motor drive shaft engagement means on said wheel member which is mounted coaxially with said motor drive shaft, to cause said wheel member to rotate with or slide with respect to said motor drive shaft.

10. The tumbler drier as claimed in claim 9 wherein said motor drive shaft engagement means comprises a series of ramps and steps positioned around an annulus of said wheel member.

11. The tumbler drier as claimed in claim 5 wherein said pulley is rotatably mounted on said motor drive shaft.

12. The tumbler drier as claimed in claim 2 wherein said one or more air exit apertures serve as loading apertures through which articles may be placed within or removed from said drum.

13. The tumbler drier as claimed in claim 12 wherein there is one air exit aperture of suitable size for loading and unloading purposes and which is accessible via a door attached to the cabinet at the front thereof.

14. The tumbler drier as claimed in claim 2 wherein said heater is positioned within said cabinet so that at least some of the air entering a hot air inlet aperture is heated just before entry but a negligible amount of the air circulating at other places within said cabinet is heated above its inlet temperature.

15. The tumbler drier as claimed in claim 14 wherein said heater includes two open spiral resistive heating elements and one or both may be used to provide multiple heats for drying purposes.

16. The tumbler drier as claimed in claim 15 wherein said door is hollow and serves as part of exhaust means to duct air from said air exit aperture to outside said cabinet.

17. The tumbler drier as claimed in claim 16 wherein a lint trap in the exhaust means comprises a gauze across an aperture in said door through which air from said drum passes in use, and said gauze being accessible for cleaning purposes.

18. A tumbler drier as claimed in claim 17 wherein said exhaust means includes a duct in the cabinet so that exhaust air is discharged away from said cool air inlet aperture so that it is not likely to be recirculated through said drum.

19. The tumbler drier as claimed in claim 18 wherein said cool air inlet aperture is positioned in the front of the cabinet and air from said duct exhausts at the rear of said cabinet.

20. The tumbler drier as claimed in claim 2 including a cycle timer so wired that during the last period of each cycle the heater is deactivated.

References Cited

UNITED STATES PATENTS

| | | | |
|---|---|---|---|
| 2,942,353 | 6/1960 | Barnett | 34—133 X |
| 3,043,015 | 7/1962 | Brucken | 34—133 X |
| 3,114,653 | 12/1963 | Kruzan | 34—133 X |
| 3,309,783 | 3/1967 | Worst | 34—133 X |
| 3,320,678 | 5/1967 | Berke | 34—133 X |

EDWARD J. MICHAEL, Primary Examiner